(12) United States Patent
Hawes et al.

(10) Patent No.: US 11,539,898 B2
(45) Date of Patent: *Dec. 27, 2022

(54) METHOD AND APPARATUS FOR IMAGING A SAMPLE USING A MICROSCOPE SCANNER

(71) Applicant: Ventana Medical Systems, Inc., Tucson, AZ (US)

(72) Inventors: William Roland Hawes, Hertfordshire (GB); Martin Philip Gouch, Hertfordshire (GB)

(73) Assignee: Ventana Medical Systems, Inc., Tucson, AZ (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/112,996

(22) Filed: Dec. 5, 2020

(65) Prior Publication Data

US 2021/0092308 A1 Mar. 25, 2021

Related U.S. Application Data

(63) Continuation of application No. 16/385,974, filed on Apr. 16, 2019, now Pat. No. 10,904,457, which is a (Continued)

(30) Foreign Application Priority Data

May 23, 2014 (GB) ...................................... 1409203

(51) Int. Cl.
*H04N 9/47* (2006.01)
*H04N 5/262* (2006.01)
(Continued)

(52) U.S. Cl.
CPC ........... *H04N 5/2625* (2013.01); *G02B 21/26* (2013.01); *G02B 21/367* (2013.01); *G06T 5/006* (2013.01);
(Continued)

(58) Field of Classification Search
CPC .... H04N 5/2625; G02B 21/26; G02B 21/367; G06T 5/006; G06T 7/20;
(Continued)

(56) References Cited

U.S. PATENT DOCUMENTS 4,170,737 A 10/1979 Bobrov et al.
5,068,739 A 11/1991 Filo
(Continued)

FOREIGN PATENT DOCUMENTS

DE 102011075369 A1 11/2012
EP 2098900 A1 9/2009
(Continued)

OTHER PUBLICATIONS

International Preliminary Report on Patentability dated Dec. 8, 2016 in corresponding PCT/GB2015/051494 filed May 21, 2015, pp. 1-17.
(Continued)

*Primary Examiner* — Masum Billah
(74) *Attorney, Agent, or Firm* — Charney IP Law LLC; Thomas M. Finetti

(57) ABSTRACT

A microscope scanner is provided comprising a detector array for obtaining an image from a sample and a sample holder configured to move relative to the detector array. The sample holder can be configured to move to a plurality of target positions relative to the detector array in accordance with position control signals issued by a controller and the detector array is configured to capture images during an imaging scan based on the position control signals.

14 Claims, 7 Drawing Sheets

Related U.S. Application Data continuation of application No. 15/359,603, filed on Nov. 22, 2016, now Pat. No. 10,313,606, which is a continuation of application No. PCT/GB2015/051494, filed on May 21, 2015.

(51) Int. Cl.
| | | |
|---|---|---|
| *G02B 21/26* | (2006.01) | |
| *G02B 21/36* | (2006.01) | |
| *G06T 5/00* | (2006.01) | |
| *G06T 7/20* | (2017.01) | |

(52) U.S. Cl.
CPC ...... *G06T 7/20* (2013.01); *G06T 2207/10056* (2013.01); *G06T 2207/20221* (2013.01); *G06T 2207/30244* (2013.01)

(58) Field of Classification Search
CPC . G06T 2207/10056; G06T 2207/20221; G06T 2207/30244; G01B 11/27; G01B 21/047; G01B 11/25; G01N 19/00
USPC .......................................................... 348/79
See application file for complete search history.

(56) References Cited

U.S. PATENT DOCUMENTS

| | | | |
|---|---|---|---|
| 5,912,699 A | | 6/1999 | Hayenga et al. |
| 7,162,292 B2 * | | 1/2007 | Ohno ..................... A61B 34/20 |
| | | | 600/443 |
| 8,164,622 B2 | | 4/2012 | Crandall |
| 2002/0089740 A1 * | | 7/2002 | Wetzel .................. H04N 7/188 |
| | | | 359/368 |
| 2002/0196336 A1 * | | 12/2002 | Batson .................. H04N 7/188 |
| | | | 348/94 |
| 2003/0127609 A1 | | 7/2003 | El-Hage et al. |
| 2004/0252875 A1 | | 12/2004 | Crandall et al. |
| 2005/0174583 A1 | | 8/2005 | Chalmers et al. |
| 2005/0174584 A1 | | 8/2005 | Chalmers et al. |
| 2006/0283240 A1 | | 12/2006 | Struckmeier et al. |
| 2007/0002434 A1 | | 1/2007 | Juskaitis et al. |
| 2007/0147673 A1 | | 6/2007 | Crandall |
| 2007/0167842 A1 * | | 7/2007 | Tanikawa ............. A61B 5/0071 |
| | | | 600/476 |
| 2009/0231689 A1 * | | 9/2009 | Pittsyn ..................... G01B 9/04 |
| | | | 359/363 |
| 2009/0304288 A1 | | 12/2009 | Rohaly |
| 2009/0326359 A1 * | | 12/2009 | Hendriks ........... G01N 21/6458 |
| | | | 600/407 |
| 2010/0034445 A1 * | | 2/2010 | Ulmer .............. G01N 27/44721 |
| | | | 204/461 |
| 2010/0141829 A1 * | | 6/2010 | Jalali ..................... A61B 5/0062 |
| | | | 382/280 |
| 2010/0187091 A1 | | 7/2010 | Pierce et al. |
| 2010/0188743 A1 * | | 7/2010 | Inoue ..................... G02B 21/26 |
| | | | 359/393 |
| 2011/0108707 A1 | | 5/2011 | Cui et al. |
| 2011/0141103 A1 | | 6/2011 | Cohen et al. |
| 2011/0221881 A1 * | | 9/2011 | Shirota .................. G02B 21/26 |
| | | | 348/79 |
| 2012/0130258 A1 | | 5/2012 | Taylor et al. |
| 2012/0147224 A1 * | | 6/2012 | Takayama ............ G02B 21/367 |
| | | | 348/241 |
| 2013/0286179 A1 | | 10/2013 | Markle et al. |
| 2014/0313314 A1 * | | 10/2014 | Crandall ............... G02B 21/367 |
| | | | 348/79 |
| 2015/0317782 A1 | | 11/2015 | Dent et al. |

FOREIGN PATENT DOCUMENTS

| | | |
|---|---|---|
| JP | 2003344781 A | 12/2003 |
| JP | 2011028291 A | 2/2011 |
| JP | 2014064946 A | 4/2014 |
| WO | 2001084209 B1 | 1/2003 |
| WO | 2014040184 A1 | 3/2014 |

OTHER PUBLICATIONS

International Search Report and Written Opinion dated Jul. 24, 2015 in corresponding PCT/GB2015/051494 filed May 21, 2015, pp. 1-10.

Cheng et al., Ultrasmall line scan nonlinear optical microscope using 1D dischroic MEMS scanner and SIOB assembly (Year: 2019).

Wu et al, A compact tapping mode AFM with sliding mode controller for precision image scanning (Year: 2011).

Jpn. pat. apln. No. 2016-569383, Translation of Official Action, dated Apr. 23, 2019.

Official Action, JP 2016-569383, dated Apr. 23, 2019.

\* cited by examiner

METHOD AND APPARATUS FOR IMAGING A SAMPLE USING A MICROSCOPE SCANNER

CROSS-REFERENCE TO RELATED APPLICATIONS

This patent application is a continuation of U.S. patent application Ser. No. 16/385,974 filed on Apr. 16, 2019, which application is a continuation of U.S. patent application Ser. No. 15/359,603 filed on Nov. 22, 2016, which application is a continuation of International Patent Application No. PCT/GB2015/051494, filed May 21, 2015, which application claims priority to and the benefit of GB Application No. 1409203.5, filed May 23, 2014. Each of the above-identified patent applications are incorporated herein by reference as if set forth in their entireties.

TECHNICAL FIELD

The present disclosure relates to a method and apparatus for imaging a sample using a microscope scanner.

BACKGROUND

Microscope scanners available today typically digitise images of microscope samples, such as slides, by obtaining images of multiple sections on the surface of a sample and combining these together into an image grid to create an overall digitised image of the sample.

In order to avoid any spatial distortions in the image it is advantageous to ensure that each image is obtained at regularly spaced intervals on the sample. Current microscope scanners attempt to achieve this by moving the sample at a constant velocity relative to a detector and then acquiring multiple images of the sample at a given frequency using the detector. The movement of the sample may be synchronised with the capture rate of the detector so as to enable image capture at the maximum possible rate whilst ensuring that the surface of the sample is fully imaged. Despite this it has been found that spatial distortions can still occur in the digitised image.

SUMMARY

In accordance with a first aspect of the present disclosure there is provided a microscope scanning apparatus comprising: a detector array for obtaining an image from a sample; a sample holder adapted to hold the sample when in use, said sample holder being configured to move relative to the detector array; and, a controller configured to issue position control signals so as to control the relative position of the sample holder; wherein the sample holder is configured to move to a plurality of target positions relative to the detector array during an imaging scan in accordance with the position control signals and wherein said detector array is configured to capture images based on the position control signals during the imaging scan.

The present disclosure provides, among other things, an improved method for imaging a microscope sample by addressing a number of shortcomings in the prior art. Some prior art methods assume that the motion between the sample and the detector is at a constant velocity during the scan and thus that any images acquired at equal intervals in time necessarily correspond to equal distances on the sample. This assumption cannot always be relied upon as it is generally difficult, or at the very least expensive, to produce microscope scanners with the required sensitivity so as to provide a truly constant velocity. The velocity of the sample instead typically fluctuates about a mean value during the image scan. These fluctuations mean that certain images of the sample occur at the wrong locations and thus spatial distortions occur when the images obtained from the scan are mapped onto an image grid or aggregate image.

There is another inherent limitation in some prior art methods, namely that the efficiency is compromised by the need to wait for the sample to be accelerated to a constant velocity before imaging can occur and then subsequently decelerated thereafter. There is hence an inherent period of 'dead-time' during which image capture does not occur. This increases the overall duration of the scan and can be particularly limiting when multiple image swathes are sought from multiple samples.

These and other limitations are addressed by using a sample holder which is configured to move to a plurality of target positions in accordance with position control signals issued by a controller, whilst a detector array is configured to capture images of a sample based on these position control signals. The position control signals correspond to various target positions on the sample such that sample is uniformly imaged. Thus, rather than capturing images at fixed time intervals and relying on the detector arriving at regularly spaced intervals on the target, image capture is instead tied to the issuing of commands by the controller urging the sample holder to arrive at nominal target positions as viewed by the detector. These target positions may be equally spaced relative to the optic axis of the detector. This increases the accuracy of the system as it is no longer reliant upon its ability to maintain a constant velocity. The detector array may also be configured to capture images in accordance with demand velocities; i.e. velocities which the controller instructs the sample holder (or detector array) to achieve as this is essentially a time derivative of the target positions and hence the image capture is still based on the position control signals.

The efficiency of the system is also improved as image capture can now occur during the 'ramp up' and 'ramp down' accelerating stages of the sample motion. This in turn increases the flexibility of the system as different microscope slide scanners with different respective inertias and limitations may be accounted for by relying upon the position capture signal so that no matter the velocity, image capture is still triggered.

The sample holder is configured to move to a plurality of target positions relative to the detector array during an imaging scan. This could mean that the sample holder is moved along a scan path whilst the detector array is held stationary, or that the detector array is moved along a scan path whilst the sample holder is held stationary. In principle, each could be in motion also. The exact method by which this relative movement is obtained is not important so long as different areas of the sample are consequently within the field of view of the detector during the imaging scan.

The plurality of target positions can correspond to a target velocity profile. Said target velocity profile can be stored on a memory accessed by (or which is accessible by) the controller. The target velocity profile can be thought of as the predetermined velocity-time trajectory for the sample motion. This includes information concerning where the sample holder 'should' be during the scan and includes any accelerating, constant velocity or decelerating phases. The detector array can be configured to capture images based on the position control signals at fixed distal intervals on the velocity profile. In order to obtain a complete and continuous image of the sample made up of contiguous individual images or 'image lines', each image captured by the detector array can be distally spaced on the surface of the sample by a target distance substantially equal to the field of view of the detector array. This ensures that there is no overlap between adjacent images and that there are no missing lines or gaps in the combined "aggregate" image.

In some embodiments, a motor adapted to drive the sample holder relative to the detector array may be provided. The motor may form part of any type of drive mechanism that can move either the detector array or the sample holder such that relative movement between the two is achieved. This relative movement referred to, and achieved during the imaging scan, can be in the plane perpendicular to the optical axis of the scanner through the sample. In addition to this movement, the focal height may also be modulated during the scan by other means, such as stack focus techniques, so that the sample is always in focus during the imaging scan. This focus control could, for example, be performed by the controller and a dedicated drive system.

The position control signal can be based on a desired motor output. Thus the position control signal does not necessarily relate to an actual measured position; nor does it necessarily relate to a position that has been specified by the microscope user. Instead, it relates to a demand position that the controller has instructed the motor (or any other suitable drive mechanism) to move the sample holder by or to. An example of a suitable motor is a stepper motor. These motors can be commanded to rotate specified amounts without the need for a feedback sensor. Alternatively, if a more precise control of the angular position, velocity and acceleration is desired, the motor may be a servomotor. In this case whilst the sample holder is in motion, its position or velocity could be monitored and compared with the target position. The speed of the motor can then be adjusted accordingly so as to minimise any errors and achieve a target instantaneous position for the sample holder at any time during the scan.

In order to form an overall image of the sample the controller is further adapted to combine images captured by the detector array at the plurality of locations into an aggregate image. Each image obtained by the detector array can be of a different but bordering area of the sample. Thus the controller may be adapted to combine each contiguous image captured by the detector array during an imaging scan together, e.g., accounting for any overlap or missing lines between images, for example through interpolation, so as to form a larger aggregate image of the sample.

The controller can be further configured to monitor the position of the sample holder. This may be monitored during the imaging scan and at (or substantially at) the time of the image capture. The monitored positional information can be stored and associated with each image in a memory for later use or analysis.

The target may take a number of forms, and can comprise a biological tissue sample. The target can show no substantial variation in surface height and so is essentially flat. For example, the target could be a stained tissue extract that has been sliced and retained between flat glass slides.

The controller can be an electronic controller for operating the apparatus in response to one or more manual user controls, or instructions embodied in circuitry or software. The controller is in communication with the drive assembly, the detector array, and the light source and may operate any of said devices. As well as controlling the apparatus, the controller may be suitable for performing an image processing function. Typically the controller comprises one or more processors and memory. The one or more processors may reside on a PC or other computer device. Furthermore, the controller may be integral with the device itself, or reside on an external computing system to which the remainder of the apparatus is connected, or both. This computing system may comprise a display and a variety of user input devices and be used to select scan areas of the sample, as well as to view any images or aggregate images that are produced.

The controller can be further adapted to map images captured during an imaging scan with respective monitored positions for each image onto a regular image grid for substantially spaced images using an interpolation technique. The aggregate image comprising individual images of the sample can be thought of as an 'image grid'. If the locations at which each image is obtained are not evenly spread, an irregular image grid will be produced. Interpolation can be used to convert this irregular image grid into a regular image grid so that there are no spatial distortions in the aggregate image; as if each image was obtained at regular distal intervals on the sample.

When it comes to combining the images captured by the detector array into an aggregate image, the controller may utilise the monitored positional information for each image so as to account for any discrepancies between the demand position and the actual monitored position of the sample holder. An overall image of the sample may hence be produced in which any spatial distortions have been accounted for through interpolation. Such discrepancies could occur, for example, due to the impact of external vibrations on the system or any failures or limitations in the drive mechanism that ultimately mean the sample holder is not at the position it is instructed to be at by the controller at a given time. A variety of known interpolation techniques may be used to map the image onto a regular image grid, such as cubic interpolation between nearest neighbours.

According to a second aspect of the disclosure there is provided a method for imaging a sample using a microscope scanner comprising: a detector array for obtaining an image from the sample; a sample holder adapted to hold the sample when in use, said sample holder being configured to move relative to the detector array, and a controller configured to issue position control signals so as to control the position of the sample holder, the method comprising: issuing position control signals so as to move the sample holder to a plurality of target positions relative to the detector array during an imaging scan, and; capturing images of the sample using the detector array based on the position control signals during the imaging scan.

The features of the second aspect of the disclosure share the same advantages as those discussed with reference to the apparatus in the first aspect of the disclosure.

BRIEF DESCRIPTION OF THE DRAWINGS

Examples of methods and apparatuses according to the present disclosure are now described with reference to the accompanying drawings, in which.

DETAILED DESCRIPTION

Figure 1:
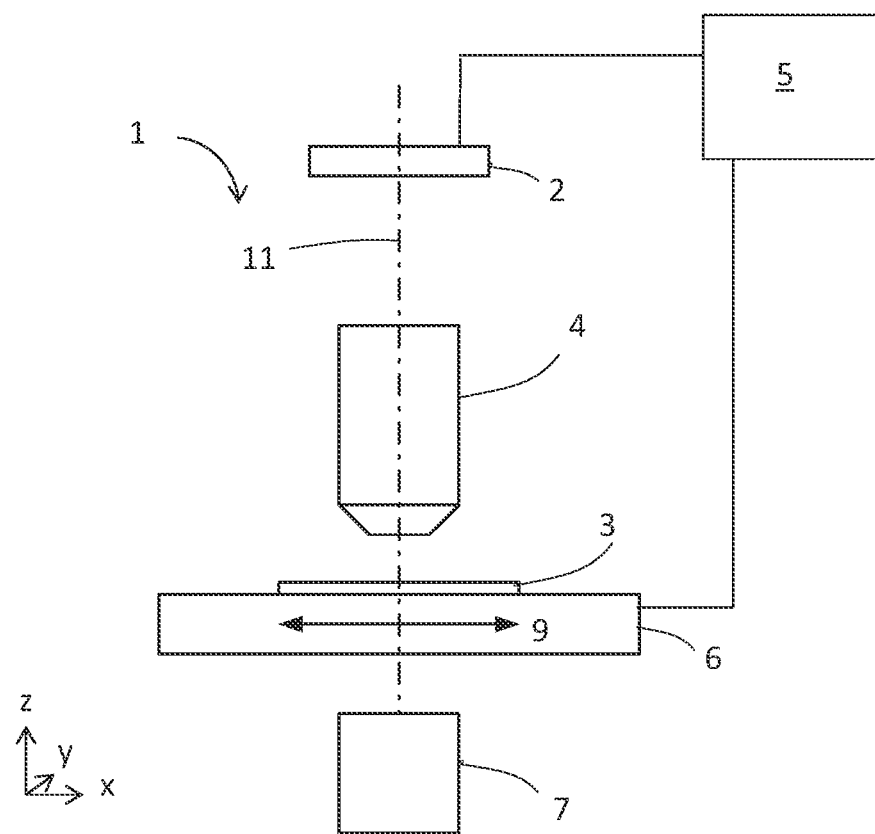
FIG. 1 is a schematic representation of a first example apparatus.

An example of an image scanning apparatus 1 is shown in FIG. 1. This comprises a sample holder 6, such as a stage, adapted to hold a sample 3 contained on a microscope slide. The sample holder 6 is optically aligned with imaging optics 4 and a detector array 2 such as a line scan detector. The imaging optics 4 and detector array 2 may together form an integral unit such as a line scan camera.

The sample holder 6 is adapted to move relative to the detector array 2 as shown by the horizontal arrows in FIG. 1. A light source 7, comprising one or more LEDs, is provided so that light from the light source 7 illuminates the sample 3 and arrives at the detector array 2 through the imaging optics 4.

A controller 5 is provided and configured to issue position control signals so as to control the relative movement between the sample holder 6 and the detector array 2. In the present example the sample holder 6 is moved whilst the remainder of the microscope scanner 1, including the detector array 2, remains stationary. The detector array 2 (together with the imaging optics 4) may be moved instead as only relative movement between this and the sample 3 is required. Typically the sample holder 6 is moved relative to the detector array, perpendicular to the optical axis 11 of the scanner 1, by a drive mechanism (not shown) that may include a motor and tracks. This is because the sample holder 6 is usually lighter than the camera and thus has a lower inertia.

Figure 4:
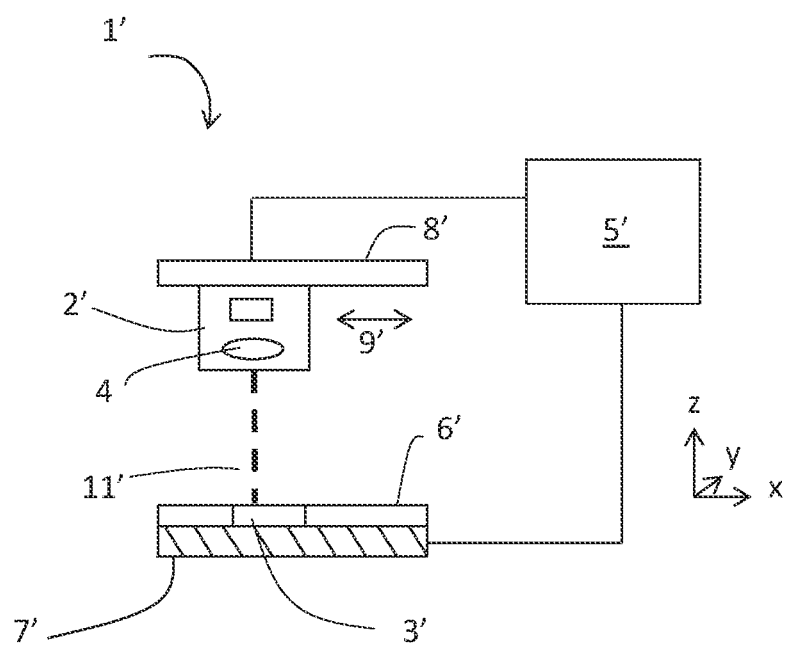
FIG. 4 is a schematic representation of a second example apparatus.

Coordinate axes are also provided in FIGS. 1 and 4 for reference. The ordinate z-axis is aligned with the optical axis 11 of the microscope scanner 1, whereas the abscissa x-axis represents the scan direction (parallel to the horizontal arrow in FIG. 1). The surface of the sample 3 is aligned with the xy plane.

The sample holder 6 is configured to move along the x-axis during an imaging scan path. The image acquired by the movement of the apparatus across the image scan path forms a swathe. The method finds particular use when implemented using a line scan detector or a 'line scanner'. Line scan detectors typically comprise a photodetector array in the form of a narrow strip or line of pixels. Alternatively an area scanner, which is essentially a two dimensional line scanner, could be used. The array detector is typically configured to be incrementally moved between locations on the surface target, parallel to the narrow direction of the array (in the event that a line scanner is used) so as to acquire additional scan lines for each location. Once a complete swathe has been obtained the sample holder may be returned to its initial position and laterally offset (in the y-direction) so as to obtain additional swathes such that the target 3 is fully imaged.

Figure 2:
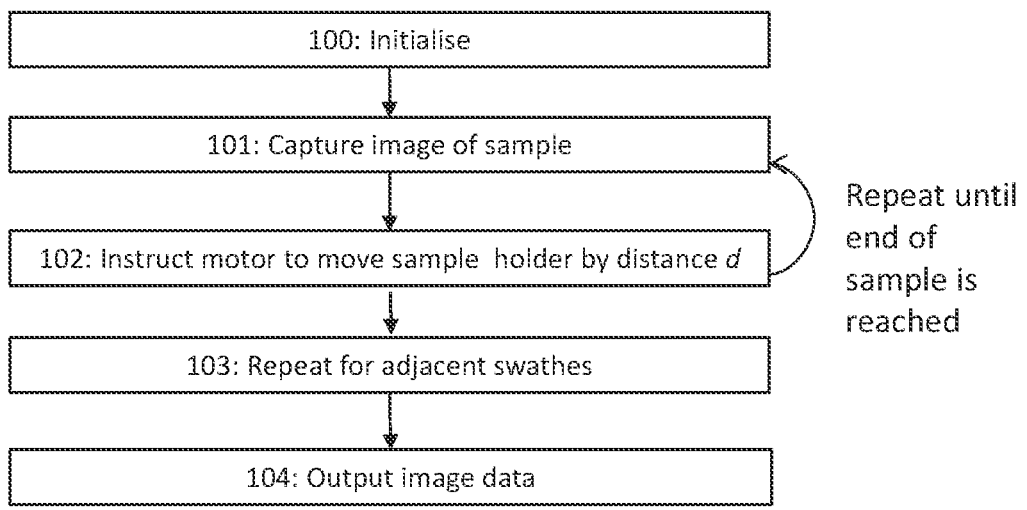
FIG. 2 is a flow diagram of a first example method.

The operation of the image scanning apparatus 1 in performing a first example method will now be described with reference to FIGS. 1 and 2. With reference to the flow diagram of FIG. 2, the method begins at step 100 where any set-up and initialisation procedures are performed including positioning the sample 3 under the imaging optics 4 so that the scan area of the sample 3, which is selected by a user, is just outside the field of view of the detector. The scan starts as the scan area is moved into the field of view of the detector.

Once the image scan has commenced a first image of the sample is captured by the detector array 2 at step 101 in response to a position control signal issued by the controller 5. The controller 5 then issues a position control signal to a motor so as to move the sample holder 6 along an image scan path on a track aligned with the x-axis. In the first example method a stepper motor is used to drive relative movement between the detector array 2 and the sample 3. Stepper motors can be commanded to rotate specified amounts without the need for a feedback sensor. A stepper motor divides a full rotation into a number of equal steps known as the step count. Thus the image capture may be triggered in accordance with this step count; for example to occur every thousand steps. This corresponds to fixed distal intervals on a predetermined target velocity profile or velocity-time trajectory stored on a memory that is accessed by the controller and includes any accelerating, constant velocity and decelerating phases of the sample motion.

Typically the target locations on the image scan path are distally separated from one another by a distance d on the sample approximately equal to the field of view of the detector. The field of view depends on the detector used and the resolution or magnification selected by a user, however it is typically between 0.25 micrometres and 0.2 micrometres for line scan detectors. In the event that an area scanner is used instead, the field of view will typically be between 1 and 5 millimetres. For example, a line scan camera with an optical magnification of 40× would typically use a 10 micrometre pixel size sensor to produce a pixel size of 0.25 micrometres at the sample. The scanning system would then be instructed to capture an image line for every 0.25 micrometres moved.

Once the controller has determined that a threshold number of steps have been reached, it issues a position control signal causing the detector to capture a second image of the sample. Steps 101 and 102 are then repeated until the end of the sample is reached i.e. a complete image swathe is formed. The sample holder 6 is continuously moved during the scan and images are obtained by the line scan detector 2 whilst the sample 3 is in motion. For a suitable choice of array detector it is not necessary to stop the movement of the sample 3 so that an image can be captured. In addition to this movement, the focal height of the system (in the z-direction) may be automatically adjusted during the scan so that the sample 3 is kept in focus. This focus control may be performed using the controller 5 and a dedicated drive mechanism.

Once a complete image swathe has been obtained, in the event that a, rectangular scan area, larger than the area by the swathe is selected, the moveable stage 6 is returned to the initialisation position and laterally offset in the y-direction by a distance equal to the field of view of the detector array 2. Steps 101 and 102 are then repeated for yet un-imaged areas of the sample to form additional adjacent swathes until the entire desired area of the sample is imaged. This is performed at step 103. Non-rectangular scan areas may be desired instead, in which case an appropriate, alternative movement will be made. At step 104 each image or "image tile" obtained at the plurality of target positions during the imaging scan is combined together so as to form an aggregate image of the sample. This aggregated image of the sample may then be analysed by a system user or technician.

Figure 3:
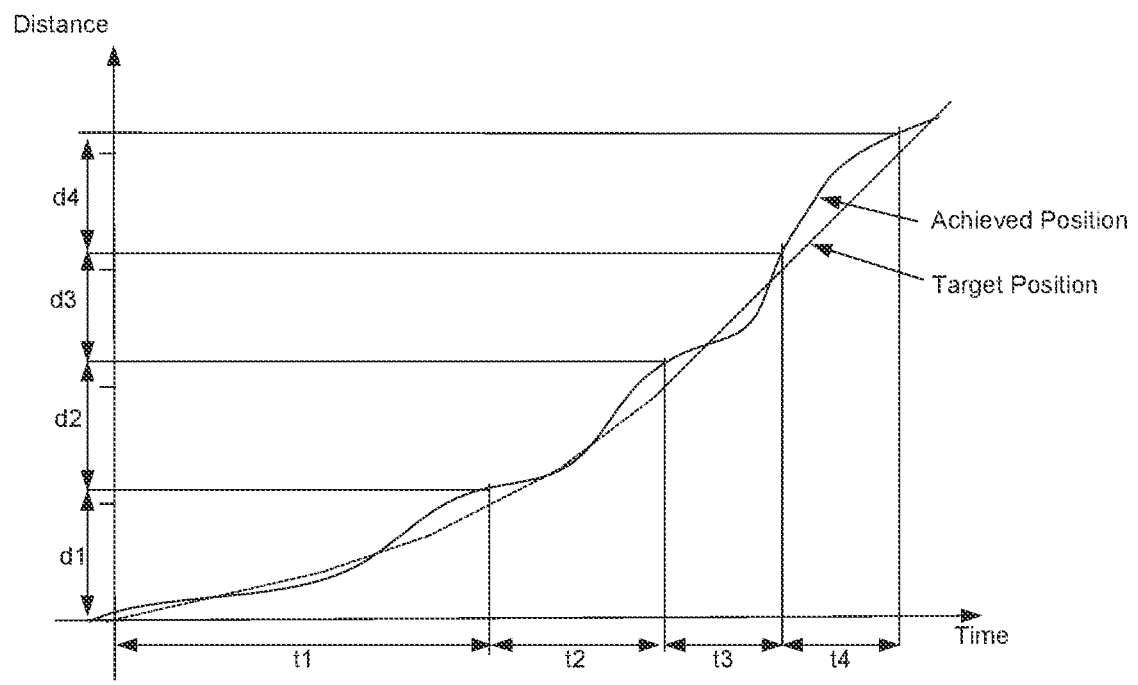
FIG. 3 is a velocity profile obtained in accordance with a second example method.

FIG. 3 illustrates a velocity profile that may be achieved according to a second example method. The second example method of the disclosure broadly matches the first example however a servomotor is used instead of a stepper motor to drive relative movement between the sample holder 6 and the detector array 2.

A velocity profile shows the relationship of the displacement of the sample 3 (dictated by movement of the sample holder 6) with time. The sample holder 6 is configured to move to a plurality of target positions during an imaging scan. These target positions are shown by the smooth dotted line or 'target velocity profile' shown in FIG. 3. This target velocity profile may be stored on a memory that is accessed by the controller during the imaging scan so as to drive movement of the sample holder 6 in accordance with this profile. The actual achieved position of the sample holder 6 (or sample 3) is shown by the continuous line that oscillates about the target velocity profile. In practice this position is not known by the system.

Unlike the prior art methods the present disclosure allows for image capture to occur during the accelerating and decelerating phases of the sample motion. This is shown by the increasing gradient of the solid line in FIG. 3. Rather than necessarily being linked to time, image capture may instead be linked to the distance moved by the sample holder 6 whilst the image capture occurs at a variable frequency dictated by the position control signals. FIG. 3 illustrates an example in which image capture occurs at distances d1, d2, d3 and d4 which correspond to times t1, t2, t3 and t4 respectively. As shown, the distances d1 to d4 are each approximately equal, whereas the times t1 to t4 are not. It is further shown that although the motion of the sample 3 is in accordance with the target velocity profile, in practice due to the limitations of the slide scanner 1 it can be difficult to exactly match this profile and thus the actual achieved position or velocity profile oscillates about this target. Thus a spatial distortion in the image may still occur due to the sample not being exactly at the target position at the time which the image is captured.

In the second example method (illustrated in FIG. 3) the motor used to drive relative motion between the sample holder 6 and the detector array 2 is a servomotor. Servomotors allow for precise control of velocity and acceleration and comprise a motor coupled to a sensor for position of velocity which is fed back via a closed loop to the motor. Thus a sensor may monitor either the position or velocity of the sample holder 6 and continuously feed this information back to the motor in order to adjust the power supplied by the motor so as to match the target profile. This feedback is evident by the oscillation about the target velocity profile.

A second example of a microscope scanner 1' according to the disclosure is illustrated in FIG. 4. The features of this example broadly match those of the first example apparatus however the detector is moved instead of the sample holder during the image scan. The apparatus 1' comprises a scan head 2', such as a line scan detector, comprising a photodetector array and imaging optics 4'. A sample holder or platen 6' is provided upon which is positioned a target to be scanned 3'. The target is typically a biological tissue sample. The scan head 2' is attached to a track 8' enabling it to be moved with respect to the remainder of the apparatus 1' along the x-axis, as indicated by the arrows 9'. Motion of the scan head 2' is driven by a servomotor configured to operate according to a target velocity profile stored in memory.

The track 8' and the scan head 2' are coupled to a linear incremental encoder configured to monitor the position of the scan head 2' relative to the sample holder along a scan path. The track 8' also allows the scan head to be offset in the y-direction for imaging adjacent swathes. The image scanning apparatus 1' is controlled using a controller 5' which may comprise programmable logic, a dedicated processor or a computer system. In this example a light source 7' is situated beneath the platen 6' such that light may pass through the sample 3', along the optical axis 11' of the detector array. The light source 7' is connected to the controller 5' and the intensity of the light output may be controlled by the controller 5'.

Figure 5:
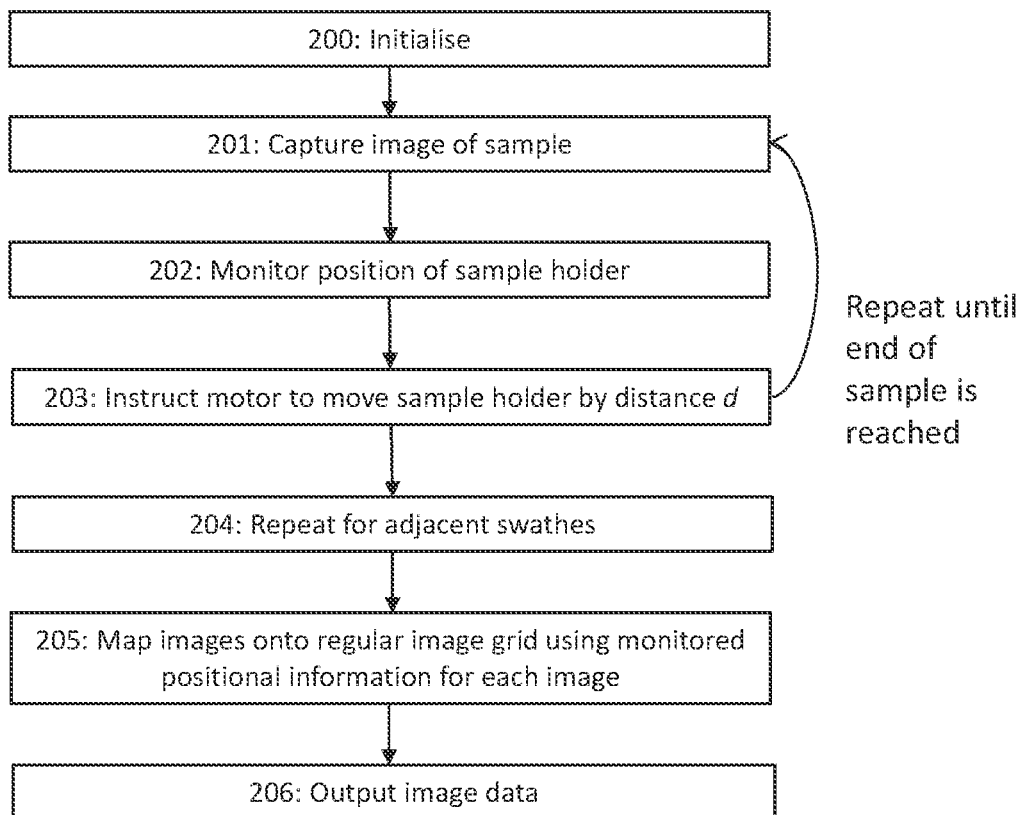
FIG. 5 is a first flow diagram illustrating a third example method.

A third example of a method for performing the disclosure will now be discussed primarily with reference to FIG. 5 which illustrates a flow diagram for performing the method and with reference to the apparatus shown in FIG. 4 and with reference to FIGS. 6 and 7. The start-up initialisation procedures are performed at step 200 before the imaging scan commences. At step 201 the imaging scan begins and the first image of the sample 3' is captured by the scan head 2'. At step 201 the position of the scan head 2' in the x-axis along the image scan path is measured using a linear encoder (not shown) coupled to the track 8' for allowing movement along the image scan path (in the x-direction). Alternatively, a rotary encoder coupled to the motor may be used. This monitored position is recorded by the controller 5' and stored in a memory referenced with the respective image for that position. At step 202 the servomotor (not shown) is instructed by the controller 5' to move the scan head 2' by distance d along the image scan path. At this point, steps 201 to 203 are repeated until the end of the sample 3' is reached for that image swathe; again with the position of the sample holder relative to the optical axis 11 of the scan head 2' being monitored for each image. The scan head 2' is then moved back to its starting position at step 200 and a lateral offset in the y-direction is made for the scan head 2' (or alternatively, the sample holder 6'). Steps 201 to 203 are repeated for adjacent image swathes until the desired surface area of the sample 3' is imaged by the scanner 1'.

Due to positional errors that can result from the impact of external vibration on the system 1 or limitations in the equipment used, the images obtained at the plurality of target locations from the imaging scan may not actually each be at exactly equal spaced distal intervals on the sample 3'. These discrepancies are illustrated by FIG. 3. Where this occurs, an irregular image grid of spatial distortions may be produced by aggregating the images. At step 205 a controller maps the irregular image grid the imaging scan onto a regular image grid for images obtained at exactly or substantially equal distances along the image scan path. This is done using an interpolation technique within the controller by one or more processors using software stored in memory.

Figure 6:
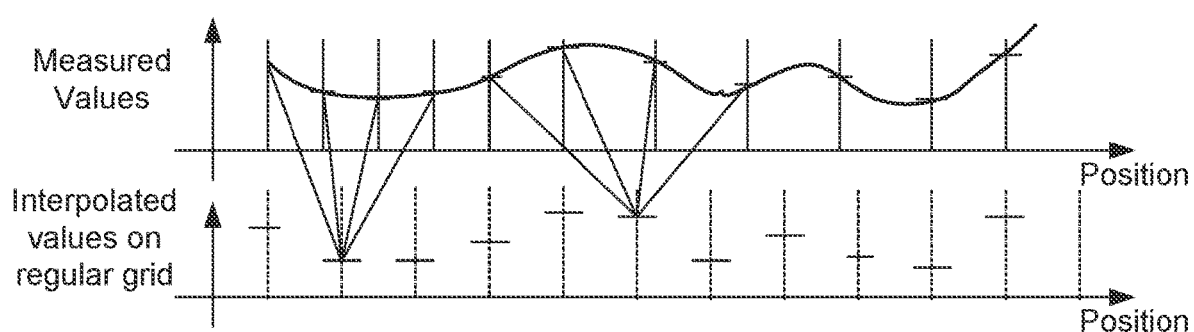
FIG. 6 is an illustration of the interpolation step according the third example method.

Step 205 is further illustrated by FIG. 6 which shows an example of an irregular and a regular image grid in one dimension. The 'measured values' displayed on the top graph show image data acquired by the imaging scan at each measured position, whilst the 'interpolated values' shown below display the result of the interpolation performed at step 205.

As shown, the mapping is performed using the monitored positional information recorded for each image during the scan and uses an interpolation technique. There are various interpolation techniques that may be used and which are known in the art. A discussion and comparison of various interpolation techniques that are utilised with a contouring and 3D surface mapping program known as Surfer™, is provided in Yang, Kao, Lee and Hung, *Twelve Different Interpolation Methods: A Case Study of Surfer* 8.0 *Proceedings of the XXth ISPRS Congress,* 2004, 778-785. Most of these techniques can be simplified for this application as the data is only irregularly spaced in one axis (along the image scan path). In addition to this, the spacing can be assumed to be regular over a small number of images. In FIG. 6 the interpolation technique used is cubic interpolation with sample points being taken from the four nearest neighbours.

Figure 7:
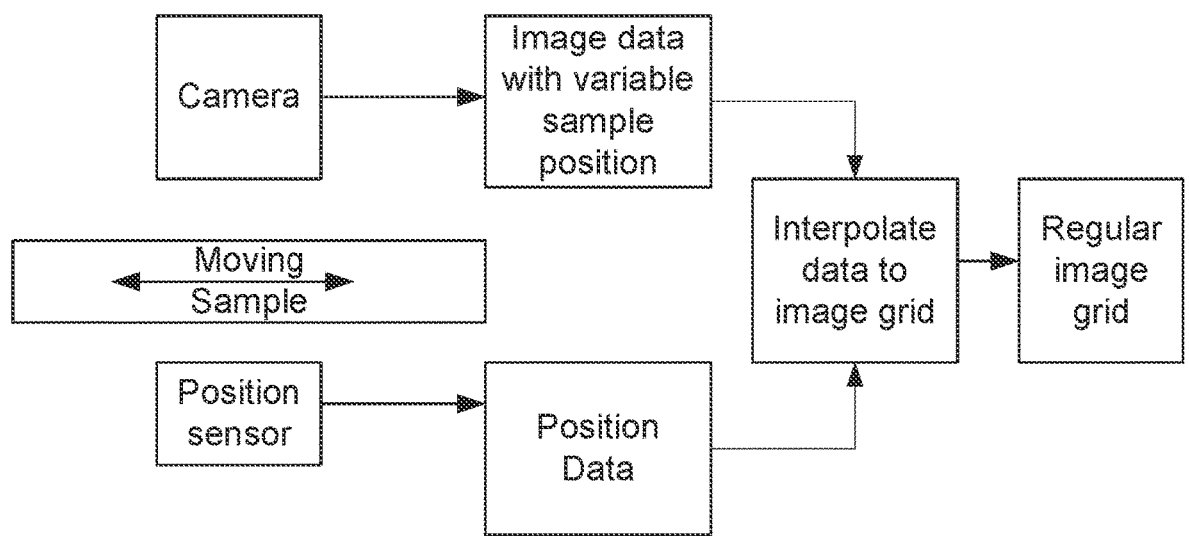
FIG. 7 is a flow diagram illustrating a fourth example method.

FIG. 7 illustrates a flow diagram of fourth example method wherein a sample is moved relative to a camera during an imaging scan and interpolation is used to correct for spatial distortions in the aggregate image. The sample is imaged as before with images being acquired by the camera based on position control signals but with varied actual distances between each image being obtained due to inherent limitations of the apparatus. A position sensor monitors the position of the moving sample during the scan and outputs this data to a controller (not shown). The position data for each image is used in combination with the image data and positional discrepancies between the target position and the actual positions are corrected for so as to interpolate data for a regular image grid. The regular aggregate image grid is then output for analysis.

Interpolation, when applied in this context, provides a number of associated advantages over the prior art. First, any errors in the sampling position are corrected during the interpolation process. There is thus a tolerance to velocity based errors that may arise from the limitations in the equipment used. Second, the scanner 1' has an increased tolerance to external vibration. Errors in the sampling position are corrected for through interpolation thus increasing the reliability of the system and the images obtained from it. Third, similar to the first example image capture can begin before the slide has reached a constant velocity; enabling the scan to ultimately be performed over a shorter timescale.

The relative position of the sample holder and detector could be monitored and any errors in the position corrected for after the scan has occurred through interpolation using prior art scanners for which image capture is triggered by a timing source rather than a demand position. However the combination of these features and triggering image capture by position control signals provides an ultimately improved method for digitising microscope samples. The position of the image capture may be more closely controlled and any discrepancies between the demand position and its actual position or any discrepancies that result from external vibration may be later corrected for through interpolation. The continuity of the aggregate image obtained as a result is thus greatly improved.

In the present disclosure, the verb "may" is used to designate optionality/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, e.g. as designating one, at least one, at least two, each or all of the respective elements. Similarly, the term "any" may be understood as designating any collection(s) of the respective elements, e.g. as designating one or more collections of the respective elements, a collection comprising one, at least one, at least two, each or all of the respective elements. The respective collections need not comprise the same number of elements.

In the present disclosure, the expression "at least one" is used to designate any (integer) number or range of (integer) numbers (that is technically reasonable in the given context). As such, the expression "at least one" may, inter alia, be understood as one, two, three, four, five, ten, fifteen, twenty or one hundred. Similarly, the expression "at least one" may, inter alia, be understood as "one or more," "two or more" or "five or more."

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Further, in describing representative embodiments of the subject disclosure, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

The invention claimed is:

1. A scanner comprising:
a detector array for capturing one or more images of a sample held by a sample holder, wherein the sample holder is adapted to move relative to the detector array to a plurality of target positions; and
a stepper motor configured to drive the sample holder to the plurality of target positions;
wherein the detector array is configured to capture the one or more images of the sample while the sample holder is in motion based on step counts of the stepper motor, and wherein the one or more images are captured after a threshold number of step counts have been reached.

2. The scanner of claim 1, wherein the threshold number of step counts corresponds to fixed distance intervals of a predetermined target velocity profile or velocity time trajectory.

3. The scanner of claim 1, wherein the motion is one of an acceleration or deceleration.

4. The scanner of claim 1, wherein the sample holder is driven by the stepper motor according to a target velocity profile.

5. The scanner of claim 1, wherein the scanner further comprises a controller to combine the captured one or more images into an aggregate image.

6. The scanner of claim 5, wherein the controller is further configured to correct detected spatial distortions in the aggregate image using an interpolation technique.

7. The scanner of claim 1, wherein the one or more images are captured at a variable frequency.

8. A method for imaging a sample comprising:
moving a sample positioned within a sample holder with a stepper motor relative to a detector array and along a first scan path in a first direction, wherein the stepper motor is configured to drive the sample holder to a plurality of target positions; and
capturing one or more images of the sample with the detector array while the sample is in motion based on step counts of the stepper motor, wherein the one or more images are captured by the detector array after a threshold number of step counts have been reached.

9. The method of claim 8, further comprising offsetting the sample a predetermined distance from the first scan path in a second direction perpendicular to the first direction.

10. The method of claim 9, wherein the predetermined distance is a distance equal to the field of view of the detector array.

11. The method of claim 10, further comprising moving the sample positioned within the sample holder along a second scan path in a third direction, wherein the third direction is substantially parallel the first direction.

12. The method of claim 11, further comprising capturing one or more images of the sample with the detector array while the sample is moved along the second scan path, wherein the one or more images are captured based on threshold distances the sample has moved along the second scan path.

13. The method of claim 8, further comprising combining the one or more captured images into an aggregate image.

14. The method of claim 8, wherein the threshold number of step counts corresponds to fixed distance intervals of a predetermined target velocity profile or velocity time trajectory.

* * * * *